(12) United States Patent
Stortz et al.

(10) Patent No.: US 9,693,393 B2
(45) Date of Patent: Jun. 27, 2017

(54) HEATED ROLL

(71) Applicant: Robert Burkle GmbH, Freudenstadt (DE)

(72) Inventors: Markus Stortz, Freudenstadt (DE); Marcel Scheerer, Freudenstadt (DE); Michael Plocher, Pfalzgrafenweiler (DE)

(73) Assignee: Robert Bürkle GmbH, Freudenstadt (DE)

( * ) Notice: Subject to any disclaimer, the term of this patent is extended or adjusted under 35 U.S.C. 154(b) by 51 days.

(21) Appl. No.: 14/810,827

(22) Filed: Jul. 28, 2015

(65) Prior Publication Data

US 2016/0037583 A1    Feb. 4, 2016

(30) Foreign Application Priority Data

Aug. 1, 2014    (DE) .................... 20 2014 103 596 U

(51) Int. Cl.
| | | |
|---|---|---|
| *B21B 27/06* | (2006.01) | |
| *H05B 3/00* | (2006.01) | |
| *F16C 13/00* | (2006.01) | |
| *H05B 3/58* | (2006.01) | |
| *D21F 5/02* | (2006.01) | |
| *H05B 3/14* | (2006.01) | |
| *H05B 3/42* | (2006.01) | |

(52) U.S. Cl.
CPC ........... *H05B 3/0095* (2013.01); *D21F 5/024* (2013.01); *F16C 13/00* (2013.01); *H05B 3/141* (2013.01); *H05B 3/42* (2013.01); *H05B 3/58* (2013.01)

(58) Field of Classification Search
CPC . D21F 5/022; D21F 5/02; D21F 5/162; D21F 5/16; F26B 13/08; F26B 13/10; F26B 13/14; F26B 13/18; F26B 13/183; B21B 27/08; B21B 27/086; D06C 5/08; D06C 5/10; H05B 3/0095; H05B 3/141; H05B 3/42; H05B 3/58; F16C 13/00
See application file for complete search history.

(56) References Cited

U.S. PATENT DOCUMENTS 4,560,860 A * 12/1985 Fauser .................... B21B 27/08
219/470
6,137,087 A * 10/2000 Tomatsu .............. H05B 3/0095
219/216

FOREIGN PATENT DOCUMENTS

| DE | 3033689 | 4/1982 |
| DE | 3400087 | 5/1985 |
| DE | 102008019720 | 10/2009 |
| WO | 2009127399 | 10/2009 |

* cited by examiner

*Primary Examiner* — Shawntina Fuqua
(74) *Attorney, Agent, or Firm* — Volpe and Koenig, P.C.

(57) ABSTRACT

A heated roll with a circular cylindrical casing tube 1 made from thermally conductive metal, which is closed at its end faces with caps 2, 3. One or more electric heating mats 8 are arranged inside the casing tube 1. By at least one connection pin 5, which is arranged at one cap 2, connection cables 11 are guided for supplying the heating mats 8 with electric power. Annular brushing bodies 7 are fastened at the connection pin 5 and serve for the electric contacting of the connection cables 11. A tensioning device 9, 14, 15 is arranged inside the casing tube 1, which presses the heating mats 8 permanently against the interior surface of the casing tube 1.

8 Claims, 3 Drawing Sheets

HEATED ROLL

INCORPORATION BY REFERENCE

The following documents are incorporated herein by reference as if fully set forth: German Patent Application No. 202014103596.6, filed Aug. 1, 2014.

BACKGROUND

The invention relates to a heated roll. Such a heated roll comprises a circular-cylindrical casing tube made form a thermally conductive metal, which is closed with caps at its end faces, one or more electric heating mats, which are arranged inside the casing tube, a connecting pin, which is arranged at a cap, extending along the axis of the roll and away from the casing tube, and which shows an axial passage for a connection cable to supply the heating mats with electric power, as well as an annular brushing body, which is fastened at the connecting pin and serves for the electric contacting of the connection cable.

Heated rolls of the present type are used in various arrangements, for example in drum driers for paper webs and the like as well as in copying devices. The preferred field of application of the present invention, with the invention not being limited thereto, though, is the application of hot-melt adhesives onto planar work pieces, for example aluminum plates or planar, engineered wood materials, which shall be coated with wood veneer, a film, or other web-shaped materials.

In prior art, heated rolls are heated with a thermic oil, which flows through the interior of the roll or fills the interior of the roll, and which is heated by electric heating cartridges, arranged approximately in the center of the roll. The use of thermic oil is however not optimal, because here a volume changing connection must be fastened at the roll with appropriate tubing. Additionally, the roll must be expensively protected from oil seeping out.

In order to avoid the use of thermic oil, sometimes heating cartridges are used inside the roll, without filling it with oil. However, this leads to a very uneven heat distribution on the exterior surface of the casing tube. Other alternatives known include the use of infrared radiators, which are arranged inside or outside the roll and which heat the casing tube. In addition to the high construction expense, these alternatives also exhibit problems, such as poor effectiveness and the risk of a local overheating in case of malfunctions during operation, for example when the arrangement is stationary, in which the roll is used.

Accordingly it has been suggested in DE 30 33 689 A1 to equip a heated roll with an inner tube, arranged coaxially inside the casing tube, made from a thermally conductive metal, and to insert electrical heating mats into the annular clearance formed between the casing tube and the inner tube, which heat the casing tube from the inside to the desired temperature. According to prior art, here silicon mats with embedded heating wires are provided as electric heating mats, with it being suggested for a temperature distribution as evenly as possible over the entire circumference of the casing tube to distribute several flat abutting heating mats over the circumference of the annual clearance.

In the preferred field of application of the present invention it is of the utmost importance that the exterior surface of the casing tube is at a very even temperature.

An arrangement for applying hot-melt adhesive generally includes an application roll for applying the hot-melt adhesive onto the surface of a work piece to be provided therewith as well as a dosing roll, which together with the application roll forms a dosing gap, in which either already molten and thus hot supplied hot-melt adhesive is inserted or into which the hot-melt adhesive is supplied in a solid form and melted on site. In both cases, the dosing roll must be heated, in order to allow melting the hot-melt adhesive and/or keeping it at a temperature, which renders it liquid for application and/or within a certain range of viscosity.

Commercial hot-melt adhesives largely change their dynamic viscosity in case of temperature changes; typical values are here changes in viscosity by up to 10,000 mPas at a temperature change by approximately 10° C. When the viscosity varies for example along the longitudinal extension of the application roll, the application roll and/or dosing roll is unevenly deformed in the dosing gap such that the hot-melt adhesive in the dosing gap is dosed with an uneven distribution on the application roll. This leads to an uneven application pattern on the work piece, which is not optimal with respect to quality.

SUMMARY

The present invention is therefore based on the objective to improve a heated roll of the type mentioned at the outset with regards to its homogenous heating over the entire circumference of the casing tube.

This objective is attained in a heated roll having one or more of the features described below. Advantageous embodiments and further developments of the heated roll according to the invention are described below and in the claims.

According to the invention it has also been recognized that in the heated roll according to DE 30 33 689 A1 known from prior art the heat transfer from the electric heating mats to the casing tube occurs not in an optimally homogenous fashion, because the heating mats contact the casing tube in a manner not defined, but in some areas they show more and in other areas less contact to the casing tube. By the measure according to the invention, i.e. arranging a tension device inside the casing tube which replaces the inner tube known from prior art and presses and/or pre-stresses the heating mats permanently against the interior surface of the casing tube, it is reliably ensured that the electric heating mats contact the casing tube over the entire interior surface and this way ensures a very homogenous, defined heat flow into the casing tube.

With the present invention, here rolls, which are heated with electric heating mats located inside thereof, can also be used for hot-melt adhesive—application devices. Here, advantages result also for other fields of application by the very homogenous temperature distribution in the casing tube of a heated roll with electric heating mats located inside thereof according to the invention.

In the heating mats of the heated roll according to the invention temperature sensors may be arranged, which on the one hand serve to regulate the temperature in the heating mats as well as on the other hand are used as alarm triggers to exclude any overheating of the electric heating mats. Instead of integrating the temperature sensors in the heating mats, they may also be arranged in the area of the heating mats, for example between the tension device and the heating mats and/or in respective recesses of the tension device, preferably abutting the heating mats.

To the extent temperature sensors are provided, they are preferably equipped with signal lines, which together with the connection cables for the supply of the heating mats with electric power are guided through the connection pin into the annular brushing body. Here, the signal line can then be made to contact another conductive signal line of a temperature control and maintain the contact even during the rotation of the roll.

The caps of the heated roll according to the invention, which close the casing tube at the faces, are preferably screwed to the casing tube, for example via an interior thread provided in the casing tube or via circumferentially distributed screws, which penetrate the cap and engage the face of the casing tube. The connection pin as well as a pin located opposite thereto for supporting the heated roll are then preferably connected fixed to the caps, for example by way of welding or via press fitting.

As known per se, the electric heating mats according to the invention are also made preferably from silicon with embedded electric resistance heating elements.

The tension device provided according to the invention may essentially comprise at least two compression shells, which are connected to each other via adjustment members and which via said adjustment members can be moved apart or towards each other. These compression shells are equivalent in their cross-section to arc sections and thus show the form of segments of a cylindrical casing. This ensures that the heating mats are pressed against the entire interior surface of the casing tube and thus ensure a very homogenous thermal transfer from the heating mats to the casing tube. The use of two compression shells, which in their sum form an almost complete cylindrical casing area, is here the simplest case to be handled, because then it is sufficient to use one or two adjustment members, which move the two compression shells apart or towards each other. When several circumferentially distributed compression shells are used, the required mechanics for spreading these compression shells become accordingly more expensive.

The adjustment members for generating the pressure according to the invention upon the heating mats via compression shells can in the simplest case be embodied as screw elements, which generate a relative motion between the individual compression shells. The adjustment members may alternatively also be embodied as spring-loaded pins, so that they automatically perform the spreading of the compression shells and thus ensure the compression according to the invention of the heating mats to the casing tube.

BRIEF DESCRIPTION OF THE DRAWINGS

An exemplary embodiment for a heated roll embodied according to the invention is shown in the attached drawings and in the following it is explained in greater detail. Shown are.

DETAILED DESCRIPTION OF THE PREFERRED EMBODIMENT

Figure 1:
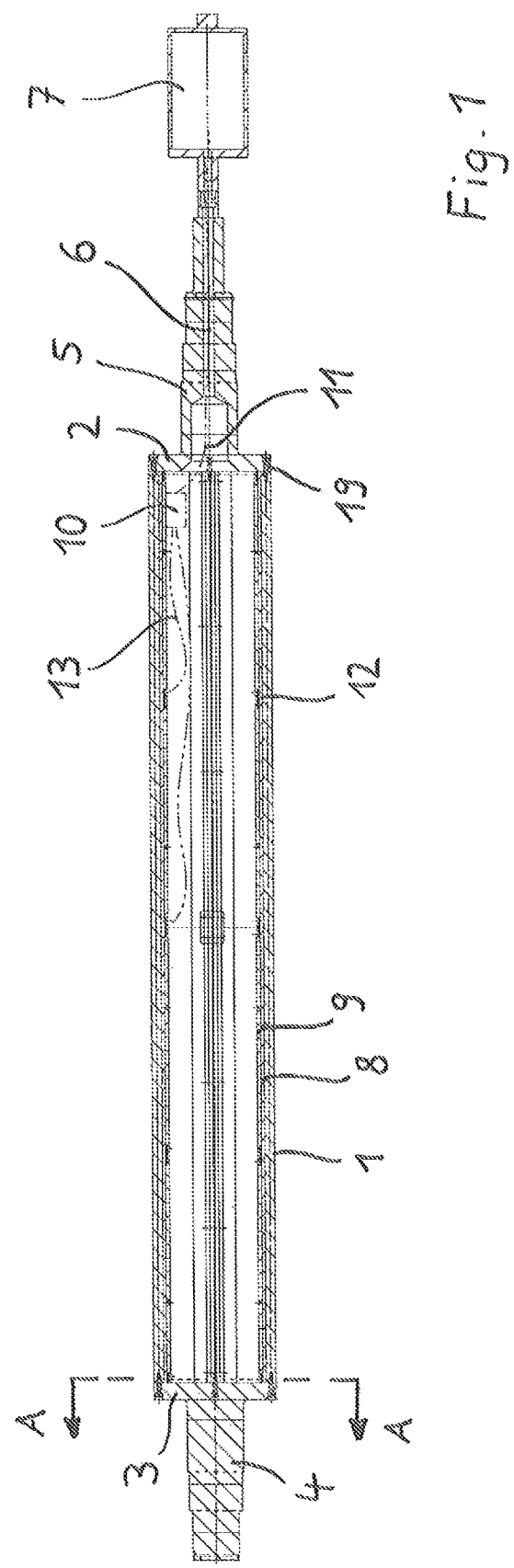
FIG. 1 a lateral cross-section of a heated roll embodied according to the invention.

The heated roll shown in FIG. 1 in a cross-section comprises a casing tube 1, which is closed at its faces with a first cap 2 and a second cap 3. A pin 4 for supporting the roll is welded to the second cap 3. A connection pin 5 serves for the same purpose, which is welded at the first cap 2. The pin 4 and the connection pin 5 extend, as common, along the longitudinal axis of the roll and/or the casing tube 1 so that it can rotate as intended.

The connection pin 5 is provided with an axial passage 6, which ends in an annular brushing body 7, located at the end of the connection pin 5 and rotating together with it.

Inside the casing tube 1, which in the present case is made from steel, electric heating mats 8 are provided, which cover the entire interior surface of the casing tube 1. The tension device with compression shells 9 ensures that the heating mats 8 are permanently and in a planar fashion pressed against the casing tube 1, so that a reliable and homogenous heat transfer is ensured from the heating mats 8 to the casing tube 1.

The electric heating mats 8 are connected via a power supply box 10 and connection cables 11 to a power source. For this purpose the connection cables 11 of the power supply box 10 are guided through the passage 6 in the connection pin 5 to the annular brushing body 7, where in a manner known per se (not shown here) contacting occurs between the rotating annular brushing bodies and the stationary contact pins and thus the connection is made to a power source (not shown either) controlling said roll.

In the area of the heating mats 8 a plurality of temperature sensors 12 are embedded in the compression shells 9, which report the measured temperature via signal lines 13, the power supply box 10, and the passage 6 in the connection pin 5, separated from the connection cables 11, as well as via the annular brushing body 7 via a separate brushing signal ring to the temperature control so that the temperature of the heating mats 8 can be controlled within narrow tolerances. Additionally, the signal of the temperature sensors 12 serves to trigger an emergency shut-off action for the power supply of the heating mats 8 in case of threatened overheating.

Figure 2:
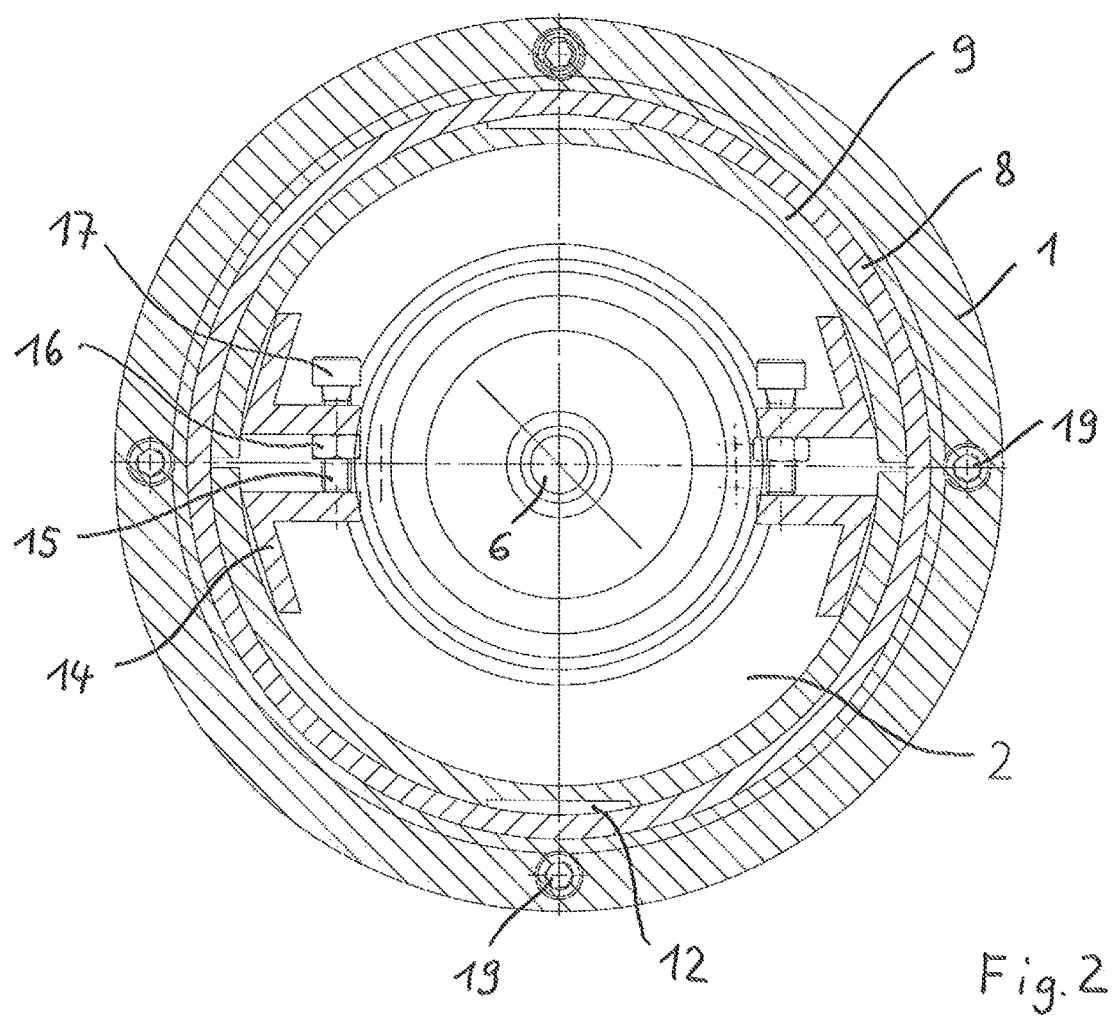
FIG. 2 a cross-sectional illustration along the line A-A of FIG. 1 in a first embodiment.

The tension device is more clearly discernible in the cross-sectional illustration in FIG. 2. Inside the casing tube 1 the heating mats 8 are discernible, here contacting the casing tube 1 over the entire surface, which mats are pressed by two compression shells 9 of the tension device against the interior surface of the casing 1, almost over the entire area and permanently. The compression shells 9 are here provided in the form of two cylindrical casing halves, thus segments of a cylinder casing describing approximately an arc of a half circle, which combined approximately form an inner tube. Via angles 14, provided at the inside at the section of the abutting edges of the two compression shells 9, the two compression shells 9 can be spread by adjustment members 15, which in the present case are embodied as screw elements 17 equipped with counter nuts 16.

By a simple loosening or tightening of the screw elements 17 here the compression shells 9 can be moved towards or apart from each other, allowing for the permanent pressure according to the invention to be applied upon the heating mats 8 and/or the pressure of the heating mats 8 against the casing tube 1.

Figure 3:
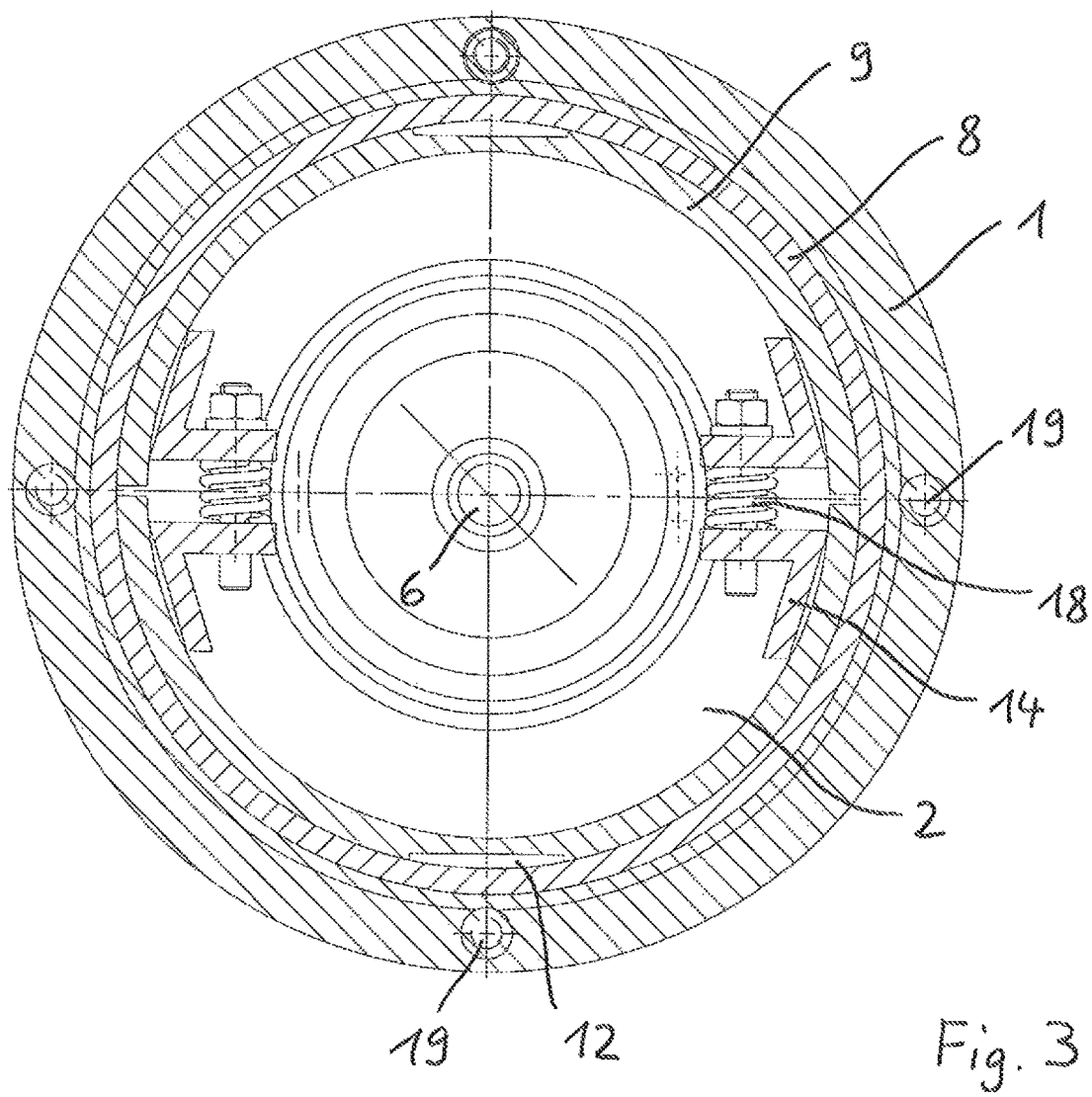
FIG. 3 a cross-sectional illustration similar to FIG. 2 showing a second embodiment according to the invention.

FIG. 3 shows almost the same design as FIG. 2, however a modification is given here in that the adjustment members 15 in FIG. 3 are embodied as spring-loaded pins 18.

FIGS. 2 and 3 additionally illustrate that the temperature sensors 12 are located in the recesses of the compression shells 9 and thus contact the heating mats 8 in a pre-stressed fashion. This leads to a reliable thermal transfer from the heating mats 8 to the temperature sensors 12 and accordingly to a very precise control of the temperature in the heating mats 8.

As clearly discernible from a combined analysis of FIGS. 1 and 2, the caps 2, 3 of the present exemplary embodiment are simply placed flush onto the face of the casing tube and connected there via screws, namely with at least four screws 19, which penetrate the respective caps 2, 3 and engage the casing tube 1 at the faces. This embodiment of the caps 2, 3 simply placed thereon allows not only a simple construction and an uncomplicated assembly and disassembly of the roll. Rather it also allows a facial access to the interior of the casing tube 1 during the assembly of the roll or for exchanging heating mats and for maintenance and repair purposes.

The invention claimed is:

1. A heated roll comprising, a circular cylindrical casing tube (1) made from thermally conductive metal, caps (2, 3) which close axial end faces of the tube, one or more electric heating mats (8) arranged inside the casing tube (1), at least one connection pin (5) arranged on a first one of the caps (2) through which an connection cable (11) is guided to supply the heating mats (8) with electric power, an annular brushing body (7) fastened at the connection pin (5) forming an electric contact to the connection cables (11), and a tension device (9, 14, 15) arranged inside the casing tube (1), which permanently presses the heating mats (8) against an interior surface of the casing tube (1), and the tension device comprises at least two compression shells (9) formed as segments of cylindrical casings, which are connected to each other via adjustment members (15), and the adjustment members (15) move the at least two compression shells apart or towards each other.

2. The heated roll according to claim 1, further comprising temperature sensors (12) arranged in the heating mats (8) or in an area of the heating mats (8).

3. The heated roll according to claim 2, wherein the temperature sensor (12) is provided with signal lines (13), which are guided through the connection pin (5) into the annular brushing body (7).

4. The heated roll according to claim 2, wherein first and second ones of the temperature sensors (12) are provided, with the first temperature sensors (12) serving to detect threatened overheating, and the second temperature sensors (12) providing the adjustment parameters for a control circuit to regulate a temperature of the roll.

5. The heated roll according to claim 1, wherein the caps (2, 3) are screwed to the casing tube (1).

6. The heated roll according to claim 5, wherein the connection pin (5) is connected fixed to the first one of the caps (2).

7. The heated roll according to claim 1, wherein the heating mats (8) comprise silicon with embedded electric resistance heating elements.

8. The heated roll according to claim 1, wherein the adjustment members (15) comprise screw elements (17) or spring-loaded pins (18).

* * * * *